(No Model.)
L. P. SCHRADER.
ATTACHMENT FOR CULTIVATORS.
No. 440,578. Patented Nov. 11, 1890.
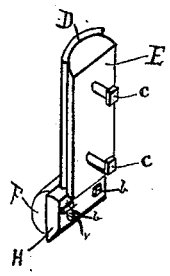
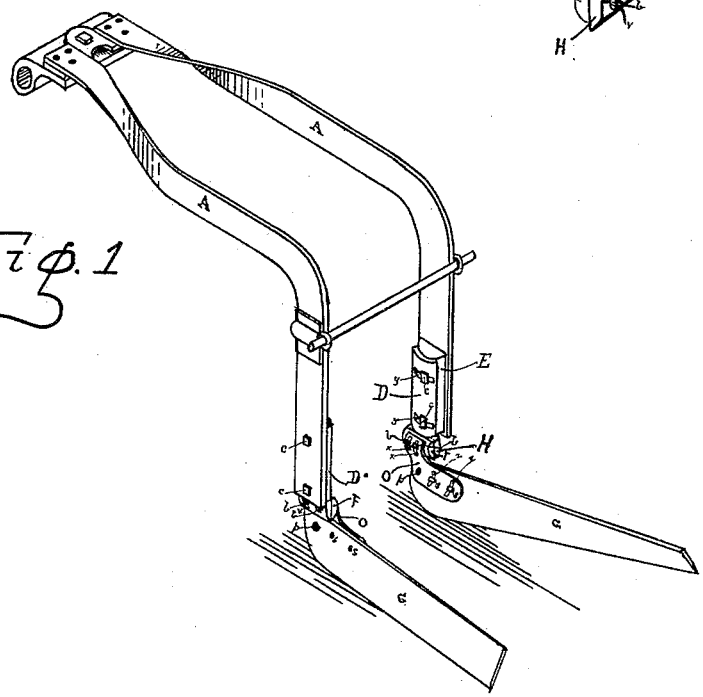
Witnesses
T. Scott Morrison.
Oscar C. Seidel.
Inventor
Lambert P. Schrader
By his Attorney H. W. Stockpole

UNITED STATES PATENT OFFICE.

LAMBERT P. SCHRADER, OF CLAY CENTRE, KANSAS.

ATTACHMENT FOR CULTIVATORS.

SPECIFICATION forming part of Letters Patent No. 440,578, dated November 11, 1890.

Application filed July 24, 1890. Serial No. 359,752. (No model.)

*To all whom it may concern:*

Be it known that I, LAMBERT P. SCHRADER, a citizen of the United States, residing at Clay Centre, in the county of Clay and State of Kansas, have invented certain new and useful Improvements in Attachments for Adjusting the Knives of Cultivators; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in the manner of adjusting the knives of cultivators; and the object is to so attach the knives to the plow-beams, by means of slotted cylindrical bearings, as that the knives may be readily and properly adjusted to any desired plane or angle. I attain this object by the mechanism illustrated in the accompanying drawings, in which—

Figure 1 is a view in perspective of cultivator plow-beams and knives with my invention for adjusting the knives attached, and Fig. 2 a detail rear view of my attachment.

Similar letters refer to similar parts throughout both views.

My invention consists of the convex-surfaced block E, covered by the slotted concave plate D and connected thereto by bolts $c\ c$. To plate D is secured foot H, having a flat or plane surface, to which is attached the horizontally-elongated block F, having a flat or plane inner surface to admit of its being freely adjusted to and secured at any desired plane, its outer surface being convex and covered by the concave shoulder to arm O, said shoulder and block being held together by means of bolts $b\ b$. Said arm O connects said device with the shovel or knife G, being pivoted thereto at $p$, and the whole being secured to the plow-beam A by means of the bolts $c\ c$, extending through the lower end thereof, and nuts screwed thereon.

The portion D E H may be discarded and only the portion F O used, by connecting said block F directly to the lower end of the plow-beam in the same manner as said block is connected with foot H. It will be readily seen that by loosening bolts $c\ c$ passing through slots $y\ y$, $b\ b$ passing through slots $x\ x$ and $v$, and S S passing through slots $z\ z$ the shovel or knife G may be adjusted to any desired position.

I am aware that various forms of concave seats are known and used, and therefore do not, broadly, claim the same; but,

Having thus described my invention, what I claim as new, and desire to secure by Letters Patent, is—

1. In a cultivator, the combination, with the plow-beams and knives, of the horizontally-elongated block F, having a flat or plane inner surface to admit of its being freely adjusted to any desired plane, its outer surface being convex, and arm O, having a concave shoulder covering the outer surface of said block F, substantially as shown and described.

2. In a cultivator, the combination, with the plow-beams and knives, of the convex-surfaced block E, secured to said plow-beam and covered by the slotted concave plate D, having foot H, to which is attached the convex-surfaced block F, with the angular arm O, having a concave shoulder fitted thereto, substantially as shown and described.

In testimony whereof I affix my signature in presence of two witnesses.

LAMBERT P. SCHRADER.

Witnesses:
J. A. MORRISON,
T. S. MORRISON.